INVENTORS
LESTER E. BAIR
GERSON MEYER
LOU KRAMER

BY *Albert J. Kramer*

ATTORNEY

United States Patent Office 3,187,518
Patented June 8, 1965

3,187,518
THERMAL CHESTS
Lester E. Bair, Gerson Meyer, and Lou Kramer, Baltimore, Md., assignors to Life-Like Products Inc., Baltimore, Md., a corporation of Maryland
Filed Aug. 14, 1963, Ser. No. 302,092
2 Claims. (Cl. 62—372)

This invention relates to cold storage chests and it is more particularly concerned with improvements therein and to elements combined therewith for improving its usefulness.

An object of the invention is the provision of an element forming a structural part of the chest which can also be used, when desired, as a source of cold to keep objects placed in the chest under refrigeration.

Another object of the invention is the provision of a shelf member in combination with a cold storage chest which can be conditioned to function as a source of cold.

A still further object of the invention is the provision of a member which can be disposed on the interior of the chest to function as a structural member and also as a source of cold.

These objects and still further objects, advantages and features of the invention will appear from the following description in conjunction with the accompanying drawing.

Figure 1:
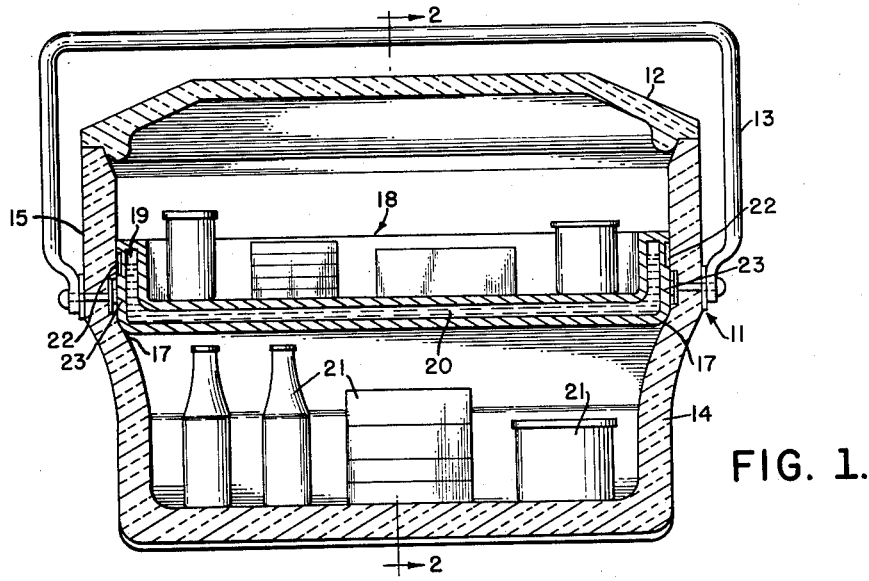
FIG. 1 is a longitudinal sectional view of a thermally insulated container having a shelf member therein in accordance with an embodiment of the invention.
Figure 3:
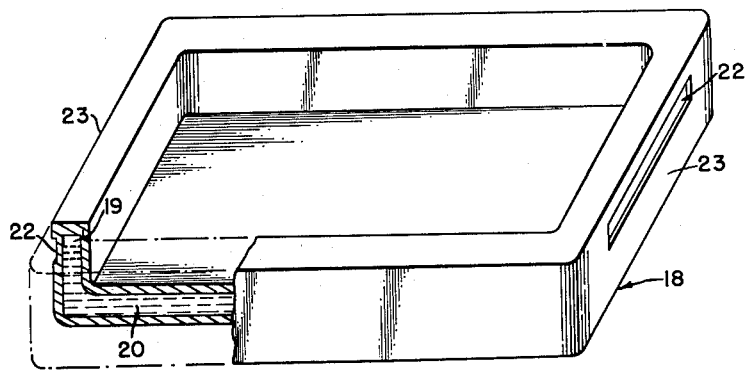
FIG. 3 is a perspective view of the shelf member, apart from the container, with a portion cut away.
Figure 2:
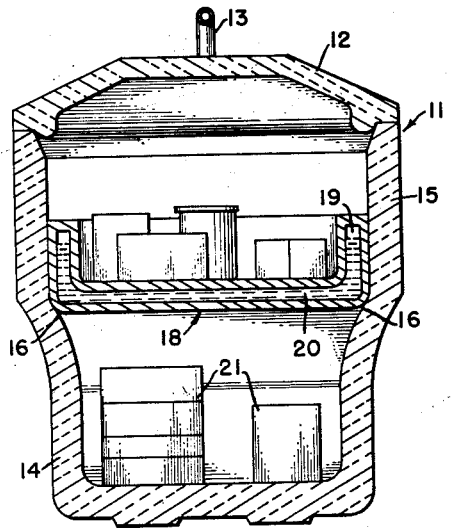
FIG. 2 is a cross sectional view along the line 2—2 of FIG. 1.

Referring with more particularity to the drawing, a thermally insulated container shown therein is of the type disclosed in U.S. Patent No. 3,024,940 and it comprises an open top box or receptacle 11 of a rigid heat insulating material, such as foamed polystyrene or other such suitable material. The receptacle is provided with a removable lid 12 of a similar insulating material. A carrying handle 13 may also be provided.

The lower section 14 is smaller in size than the upper section 15, as explained in the patent referred to above and, as a result of this difference in size, portions 16 of the side walls and portions 17 of the end walls of the lower section protrude inwardly relative to the corresponding walls of the upper section.

These protruding portions 16 and 17 form a support for a shelf member 18 which is removably disposed in the upper section.

The shelf member 18 or a portion thereof to be used as a source of cold is formed of a rigid non-porous material having good thermal conducting properties, such as non-porous polystyrene, metals, such as aluminum, alloys of various kinds, etc. and the walls thereof are formed with a hollow space 19. This hollow space is filled or partially filled with a liquid material 20 having a high coefficient of thermal exchange, including a high specific heat and/or a high latent heat of fusion with a relatively low coefficient of thermal expansion. Such liquid materials are conventionally used in ordinary containers adapted to be preconditioned by placing them in a deep freeze compartment for a period to extract heat energy and then used as a source of cold. One liquid suitable for this purpose comprises an aqueous slurry of starch. Ordinary water may also be used.

The space in the lower section below the normal position of the shelf 18 is adapted to receive food materials 21 or any other material requiring refrigeration, such as medicines, medical specimens, etc.

The shelf, before being placed in position, is preconditioned by placing it in a deep freeze compartment for a period to extract heat energy from the liquid 20.

Thus, when the preconditioned shelf is placed in the container, it will function as a source of cold and maintain the material in the lower section at refrigeration temperatures for a substantial period.

Additional materials may also be placed on the shelf 18 to be chilled in direct contact with shelf. Also, the shelf may be used apart from the container as a serving tray for materials to be kept cold while being served, such as food, or while being used biologically, such as medicine or materials during treatment of a patient. To facilitate this use, finger recesses 22 in the end walls 23 are provided.

We claim:

1. A portable container comprising thermally insulated exterior walls, said walls being shaped to delineate on the interior a bottom section relatively narrower than the upper section, said bottom section having portions of its walls protruding inwardly relative to the portions of the upper section, said protruding portions forming a tray support, a removable tray member normally disposed wholly in the upper section and seated on said protruding portions, said tray being constructed of a material having a relatively high coefficient of heat conductivity and having a hollow interior space, said space being adapted to confine a liquid material of a relatively high coefficient of thermal exchange, said tray member comprising vertical sides forming an enclosure at the top for objects to be carried by the tray and to be retained under refrigeration independently of the container.

2. A portable container comprising thermally insulated exterior walls, said walls being shaped to delineate on the interior a bottom section relatively narrower than the upper section, said bottom section having portions of its walls protruding inwardly relative to the portions of the upper section, said protruding portions forming a tray support, a removable tray member normally disposed wholly in the upper section and seated on said protruding portions, said tray being constructed of a material having a relatively high coefficient of heat conductivity and having a hollow interior space, said space being adapted to confine a liquid material of a relatively high coefficient of thermal exchange, said tray member comprising vertical sides forming an enclosure at the top for objects to be carried by the tray and to be retained under refrigeration independently of the container, said walls of the tray being provided with depressions as finger recesses to facilitate manually supporting and carrying the tray apart from the container.

References Cited by the Examiner
UNITED STATES PATENTS

| | | | |
|---|---|---|---|
| 2,225,792 | 12/40 | Nicholls | 62—457 X |
| 2,527,571 | 10/50 | Pownall | 62—459 X |
| 2,694,297 | 11/54 | Shoemaker | 62—530 X |
| 2,926,508 | 3/60 | Moon | 62—459 |
| 2,954,893 | 10/60 | Sayre | 220—17 |
| 3,024,940 | 3/62 | Meyer | 220—97 X |
| 3,059,452 | 10/62 | Griffin | 62—457 |

ROBERT A. O'LEARY, *Primary Examiner.*